United States Patent
Kono et al.

(10) Patent No.: US 9,143,420 B2
(45) Date of Patent: Sep. 22, 2015

(54) DATA TRANSPORT SYSTEM, RECEIVER AND TRANSMITTER

(71) Applicant: Hitachi, Ltd., Tokyo (JP)

(72) Inventors: Masashi Kono, Tokyo (JP); Hidehiro Toyoda, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 115 days.

(21) Appl. No.: 14/105,614

(22) Filed: Dec. 13, 2013

(65) Prior Publication Data
US 2014/0293826 A1  Oct. 2, 2014

(30) Foreign Application Priority Data
Mar. 29, 2013  (JP) ................... 2013-071233

(51) Int. Cl.
*H04L 12/26* (2006.01)
*H04J 3/06* (2006.01)
*H04J 3/16* (2006.01)

(52) U.S. Cl.
CPC ........... *H04L 43/0894* (2013.01); *H04J 3/0623* (2013.01); *H04J 3/1658* (2013.01)

(58) Field of Classification Search
CPC ...... G06Q 40/00; G10L 21/04; H04N 19/149; H04N 19/503; H04N 21/23406
See application file for complete search history.

(56) References Cited

U.S. PATENT DOCUMENTS

| | | | |
|---|---|---|---|
| 7,729,241 B2 * | 6/2010 | Winter | ........................ 370/229 |
| 2003/0081710 A1 | 5/2003 | Takeuchi et al. | |
| 2008/0232818 A1 | 9/2008 | Narita et al. | |

FOREIGN PATENT DOCUMENTS

| | | |
|---|---|---|
| JP | 2003-143097 A | 5/2003 |
| JP | 2008-227995 A | 9/2008 |

* cited by examiner

*Primary Examiner* — Chandrahas Patel
(74) *Attorney, Agent, or Firm* — Volpe and Koenig, P.C.

(57) ABSTRACT

A receiver includes a data unit decomposer for receiving data units transmitted via a transmission channel and extracting user data including invalid data and valid data by removing management data from the received data units, and a plurality of rate estimators for receiving data forwarded by the data unit decomposer and outputting the data to different output interfaces. Each rate estimator selects valid data from the user data forwarded by the data unit decomposer, inputs the selected valid data to a FIFO unit, controls read frequency of the FIFO unit based on an amount of remaining data in the FIFO unit, and estimates a transmission data rate of an associated input interface in the transmitter based on at least one of a write cycle in writing the valid data to the FIFO unit and the amount of remaining data in the FIFO unit.

9 Claims, 12 Drawing Sheets

FIG. 9

| RATE [Gbps] | WRITE CYCLE | WRITE CYCLE FOR 100 WRITES | RATE THRESHOLD |
|---|---|---|---|
| ABNORMALLY LOW RATE (0.946 Gbps OR LESS) | | | 1792 |
| 1.0625 | 15.95 | 1595 | 1472 |
| 1.25 | 13.56 | 1356 | 1024 |
| 2.125 | 7.98 | 798 | 736 |
| 2.5 | 6.78 | 678 | 512 |
| 4.25 | 3.99 | 399 | 360 |
| 5 | 3.39 | 339 | 256 |
| 8.5 | 1.99 | 199 | 180 |
| 10 | 1.70 | 170 | 167 |
| 10.3125 | 1.64 | 164 | 163 |
| 10.51875 | 1.61 | 161 | 136 |
| ABNORMALLY HIGH RATE (12.463 Gbps OR MORE) | | | - |

DATA TRANSPORT SYSTEM, RECEIVER AND TRANSMITTER

CLAIM OF PRIORITY

The present application claims priority from Japanese patent application JP2013-71233 filed on Mar. 29, 2013, the content of which is hereby incorporated by reference into this application.

BACKGROUND

This invention relates to transport of different protocol signals.

Increase in communication traffic has generated demand for higher speed and larger throughput in networks. Current core communication networks connecting line concentrators, bases, or providers' networks employ large-throughput transport achieved by data multiplexing. Examples of such large throughput transport include SDH/SONET (Synchronous Digital Hierarchy/Synchronous Optical NETwork) which multiplexes a low-speed signal with a predetermined speed signal and OTN (Optical Transport Network) which has achieved large-throughput transport by employing a concept of optical path suitable for WDM (Wavelength Division Multiplexing) communication.

The foregoing large-throughput transport technologies have a problem that extensive device configuration is required to handle a plurality of signals. In such a circumstance, a technique to achieve synchronous detection of multiple frame rates in the SDH or SONET with a single circuit is disclosed in JP 2003-143097 A. In the meanwhile, JP 2008-227995 A discloses a multi-rate interface board that generates OTN frames from low-speed signals that are not standardized as OTN frames, independently from the type of signal.

In recent years, signals (protocols) used in a network are diversified to meet their usage; for example, the link layer supports various protocols, such as Ethernet™, FibreChannel, and InfiniBand, together.

In such a circumstance, for a network that multiplexes links having different transmission data rates for transport, a multi-rate signal multiplexing technique is increasingly demanded that does not depend on the protocol or transmission data rate.

SUMMARY

Assuming to transport signals in the format of SDH and SONET which are synchronous protocol networks highly depending on accurate and stable clocks, the technique disclosed in JP 2003-143097 A detects multiple rates by detecting a pattern for synchronous detection unique to the format. Hence, this technique cannot detect the Ethernet™ signal that operates with asynchronous clocks.

Transporting signals in the OTN format enables mapping regardless of the type of signal and unified monitoring and control of the overall network; however implementation of this technique requires a plurality of data transport devices for individual OTN frame types standardized by the ITU.

The technique disclosed in JP 2008-227995 A uses identification information of optical module codes identifying the types of optical modules to detect multiple rates. Accordingly, this technique cannot be applied to a device which does not include an optical module.

Ethernet allows signals operating with asynchronous clocks to be multiplexed by encoding. However, the encoding depends on the protocol and different encodings are used for different protocols, such as 8b/10b encoding for 10 Gb Ethernet and 64b/66b encoding for 100 Gb Ethernet.

Desired is a technique to multiplex/demultiplex data for multi-rate transport in a network including different protocols. The foregoing and other problems, and novel features of this invention will be clarified by the following description and accompanying drawings.

An aspect of this invention is a data transport system for transporting data via a transmission channel. The data transport system includes a transmitter and a receiver. The transmitter includes a plurality of rate detectors for receiving data from a plurality of input interfaces, a data unit composer for adding management data to user data forwarded by the plurality of rate detectors to compose data units and sending the data units to the transmission channel. The receiver includes a data unit decomposer for receiving the data units transmitted via the transmission channel and extracting the user data including invalid data and valid data by removing the management data from the received data units, and a plurality of rate estimators for receiving data forwarded by the data unit decomposer and outputting the data to different output interfaces. Each rate detector of the plurality of rate detectors inputs valid data from an associated input interface to a first FIFO unit. Each rate detector of the plurality of rate detectors controls read frequency of the first FIFO unit based on an amount of remaining data in the first FIFO unit. Each rate detector of the plurality of rate detectors adds invalid data to valid data retrieved from the first FIFO unit to generate user data. Each rate detector of the plurality of rate detectors sends the user data to the data unit composer. Each rate estimator of the plurality of rate estimators selects valid data from the user data forwarded by the data unit decomposer. Each rate estimator of the plurality of rate estimators inputs the selected valid data to a second FIFO unit. Each rate estimator of the plurality of rate estimators controls read frequency of the second FIFO unit based on an amount of remaining data in the second FIFO unit. Each rate estimator of the plurality of rate estimators estimates a transmission data rate of the associated input interface in the transmitter based on at least one of a write cycle in writing the valid data to the second FIFO unit and the amount of remaining data in the second FIFO unit.

According to a representative embodiment of this invention, multiplexing/demultiplexing data for multi-rate transport can be achieved in a network including different protocols.

BRIEF DESCRIPTION OF THE DRAWINGS

FIG. 9 is a diagram illustrating an example of the relationship between the write cycle of the FIFO unit and the transmission data rate in the receiver in Embodiment 1;

DETAILED DESCRIPTION OF THE EMBODIMENTS

The following description is divided into a plurality of embodiments or sections if necessary for convenience; however, the embodiments or sections are not irrelevant to one another unless explicitly stated otherwise: one is in a relation of a modification, details, or supplementary explanation of a part or the entirety of another. The number (including number, numerical value, amount, and range) of some element referred to in the following description is not limited to the particular one but includes numbers more than and less than the particular number unless clearly specified or theoretically limited to the particular number.

Furthermore, in the following description, it should be understood that each element (including elemental step) is not necessarily requisite unless clearly specified or obviously considered as a theoretical requisite. Likewise, the shape or the positional relation of some element referred to in the following description includes the approximate or similar one to the shape or the position unless clearly specified or theoretically considered to be obvious. The same applies to the above-mentioned numerical values and ranges.

The configurations, functions, and processing units, for a part or all of them, may be implemented by hardware by, for example, designing an integrated circuit. The configurations and functions may be implemented by software by interpreting and executing programs to implement the functions. Hereinafter, embodiments of this invention are described in detail based on the drawings. Throughout the drawings to illustrate the embodiments, the same elements are basically denoted by the same reference signs and repetitive explanations thereof are omitted.

Embodiment 1
[General Configuration of System]

Figure 1:
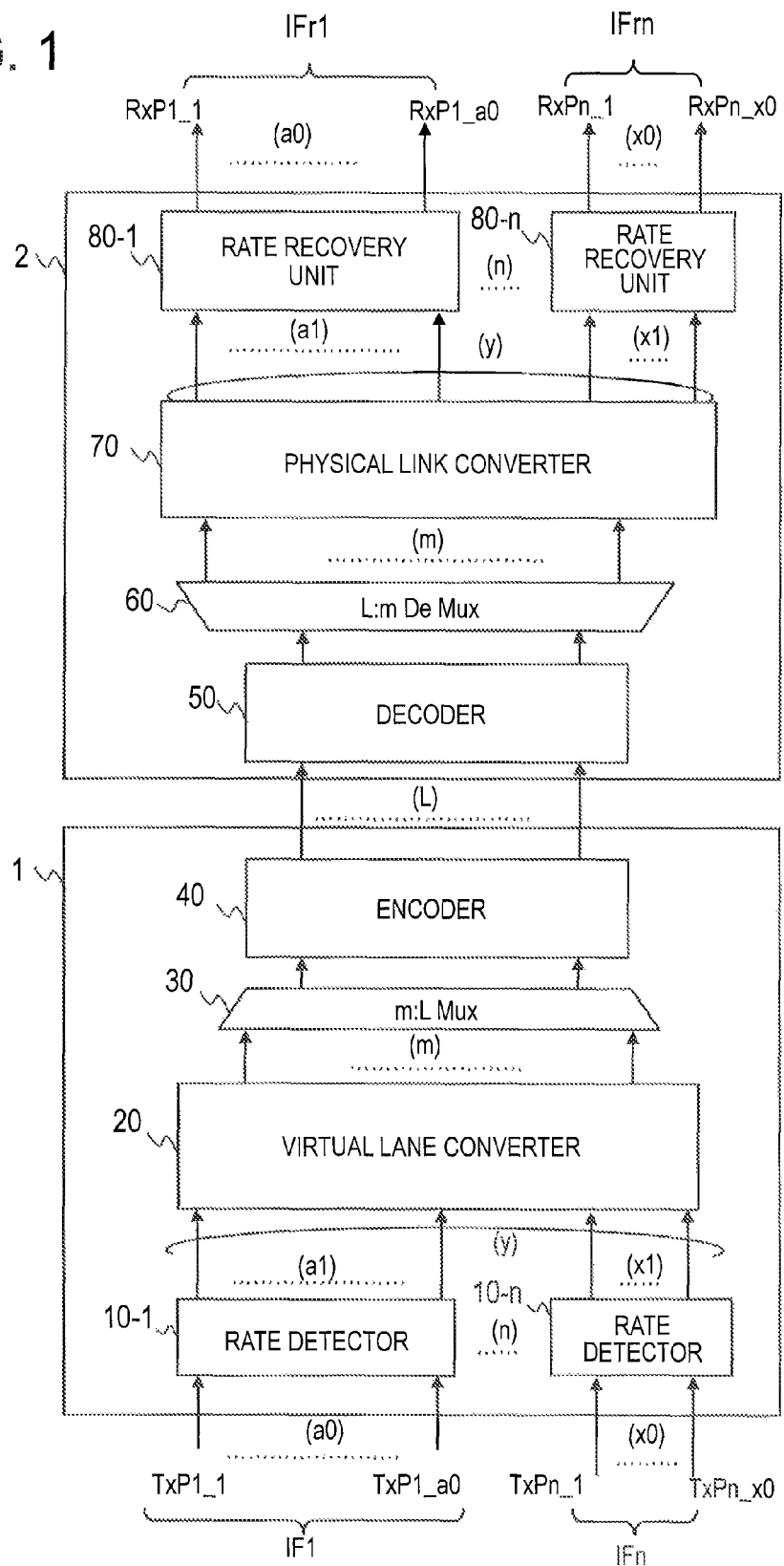
FIG. 1 is a block diagram schematically illustrating a configuration example of a data transport system in Embodiment 1.

FIG. 1 schematically illustrates a configuration example of a data transport system (communication system) in this embodiment. The data transport system includes a transmitter 1 and a receiver 2. A transmission channel composed of L (L is an integer of 1 or more) transmission lanes connects the transmitter 1 and the receiver 2; signals from the transmitter 1 are transported to the receiver 2 via this transmission channel. In the following description, each transmission lane, which is an input lane or one output lane, is a physical transmission line for transmitting serial data. The transmitter 1 and the receiver 2 are data transport devices.

The transmitter 1 multiplexes input signals from n (n is an integer of 2 or more) input interfaces (IFs) to send the multiplex signal to the receiver 2 via the transmission channel (the L transmission lanes). The receiver 2 splits the multiplex signal received from the transmitter 1 to output split signals to the n IFs.

In FIG. 1, the transmitter 1 includes the n rate detectors 10-1 to 10-n, a virtual lane converter 20, a multiplexer (Mux) 30, and an encoder 40. The receiver 2 includes a decoder 50, a demultiplexer (DeMux) 60, a physical link converter 70, the n rate recovery units 80-1 to 80-n.

[General Configuration of Transmitter]

The transmitter 1 receives input data (data frames) from the n input IFs. The input data is data (data frames) to be forwarded to the receiver 2. The n IFs may have the same number of input lanes or different numbers of input lanes. Some of the IFs may have different numbers of input lanes.

In the example of FIG. 1, the interface IF1 has a0 (a0 is an integer of 1 or more) input lanes TxP1_1 to TxP1_a0 and the interface IFn has x0 (x0 is an integer of 1 or more) input lanes TxPn_1 to TxPn_x0.

The data signals input from the n interfaces IF1 to IFn may have different frequencies among the IFs or may have the same frequency among all the IFs. The signals of some IFs may have a different frequency from the signals of the other IFs.

Examples of the signals having different frequencies include digital signals generated with clock signals having different frequency errors, digital signals generated with clock signals having different jitter characteristics, and digital signals having different bit rates, and digital signals of different protocols.

Data signals from the n interfaces IF1 to IFn enter the individually associated rate detectors 10-1 to 10-n. The rate detectors 10-1 to 10-n synchronously output the data signals to the virtual lane converter 20. As will be described later, the rate detectors 10-1 to 10-n send out valid data (valid bits) received from the interfaces IF1 to IFn and further, invalid data (invalid bits) to the virtual lane converter 20. Unlike the valid data received from the input IFs, the invalid data is added by the rate detectors 10-1 to 10-n. Hereinafter, the valid data and the invalid data are called user data.

Each of the rate detectors 10-1 to 10-n connects to the virtual lane converter 20 via a plurality of associated transmission lanes (output lanes of the rate detector). The rate detectors 10-1 to 10-n send synchronous data signals to the virtual lane converter 20 through a part or all of their plurality of associated transmission lanes. In the following description, the lanes selected by the rate detectors 10-1 to 10-n to be used for data transport are called used lanes and the lanes not to be used are called non-used lanes. The data transported by the used lanes includes valid data from the IFs and invalid data added by the rate detectors.

The rate detectors 10-1 to 10-n have the same number or different numbers of transmission lanes to the virtual lane converter 20. Only some of the rate detectors may have different numbers of transmission lanes. Each of the rate detectors 10-1 to 10-n has more output lanes than input lanes. In the example of FIG. 1, the rate detector 10-1 has a1 output lanes and the rate detector 10-n has x1 output lanes. In total, the rate detectors 10-1 to 10-n have y transmission lanes to the virtual lane converter 20.

The virtual lane converter 20, which is a data unit composer, composes a predetermined size of data units including bit strings received from the rate detectors 10-1 to 10-n via their used lanes. The virtual lane converter 20 inserts management data including a header and a marker in each data unit. In this description, this operation to compose a data unit is called virtual lane conversion. In the example described hereinbelow, the virtual lane converter 20 includes a data block having a predetermined number of bits received from a used lane in a data frame. One data block may include data of a plurality of used lanes.

The virtual lane converter 20 sends composed data units to the multiplexer 30. The virtual lane converter 20 synchronously sends m (m is an integer of 2 or more) data units to the multiplexer 30 via the m transmission lanes. In this example, the number m is equal to the number of used lanes. The number m may be greater or smaller than the number of used lanes. Specifically, the virtual lane converter 20 may send user data received from one used lane through a plurality of transmission lanes or may send user data received from a plurality of used lanes through one transmission lane.

The multiplexer 30 multiplexes data units received from the virtual lane converter 20 to send the multiplex data to the encoder 40 via the L (m>L) transmission lanes. The encoder 40 encodes received data and outputs it to the L transmission lanes. The encoding by the encoder 40 does not need to be based on rules specified by some standard; the encoding method is not limited and a known technique can be applied to the encoder 40.

[General Configuration of Receiver]

The receiver 2 receives data from the transmitter 1 via the L transmission lanes. The received data is entered to the decoder 50. The decoder 50 decodes the data encoded by the encoder 40 in the transmitter 1. Like the encoding, the method of decoding is not limited to a specific one.

The demultiplexer 60 splits the data sent from the decoder 50 into data units for the m transmission lanes and sends the data units to the physical link converter 70. The demultiplexer 60 performs processing reverse to the processing of the multiplexer 30 in the transmitter 1 in accordance with the same rules.

The physical link converter 70 refers to the management data included in the data unit composed by the virtual lane converter 20 in the transmitter 1 to acquire a user data block other than the management data. The physical link converter 70 distributes user data blocks to the associated rate recovery units 80-1 to 80-n through the y transmission lanes. This decomposing a data unit is called physical link conversion and the physical link converter 70 is a data unit decomposer. Specifically, the physical link converter 70 selects the m used lanes from the y transmission lanes and synchronously sends the m user data blocks via the used lanes.

For example, the management data in each data unit includes information identifying the associated transmission lane. The physical link converter 70 refers to this information to determine the transmission lane (used lane) to output the user data block.

The physical link converter 70 synchronously sends data to the rate recovery units 80-1 to 80-n via the y transmission lanes. The rate recovery units 80-1 to 80-n forward the received data to the output interfaces IFr1 to IFrn.

The rate recovery units 80-1 to 80-n are individually associated with the rate detectors 10-1 to 10-n and send the data from the rate detectors 10-1 to 10-n to the output interfaces IFr1 to IFrn. The interfaces IFr1 to IFrn are individually associated with the interfaces IF1 to IFn; each pair of the associated IFs follows the same protocol. For example, the data from the interface IF1 is output from the interface IFr1 via the rate detector 10-1 and the rate recovery unit 80-1.

The number of input lanes of each rate detector is equal to the number of output lanes of the associated rate recovery unit. The number of output lanes of each rate detector is equal to the number of input lanes of the associated rate recovery unit. The rate recovery units 80-1 to 80-n are rate estimators for estimating transmission data rates of the associated input interfaces IF1 to IFn. The input rate at a rate detector is recovered in the output of a rate recovery unit in accordance with the estimated transmission data rate.

For example, the number of input lanes of the rate detector 10-1 and the number of output lanes of the rate recovery unit 80-1 are both a0. The number of output lanes of the rate detector 10-1 and the number of input lanes of the rate recovery unit 80-1 are both a1. The transmission data rate at the interface IF1 is recovered at the interface IFr1.

[Detailed Configuration and Operations of Transmitter]

Figure 2:
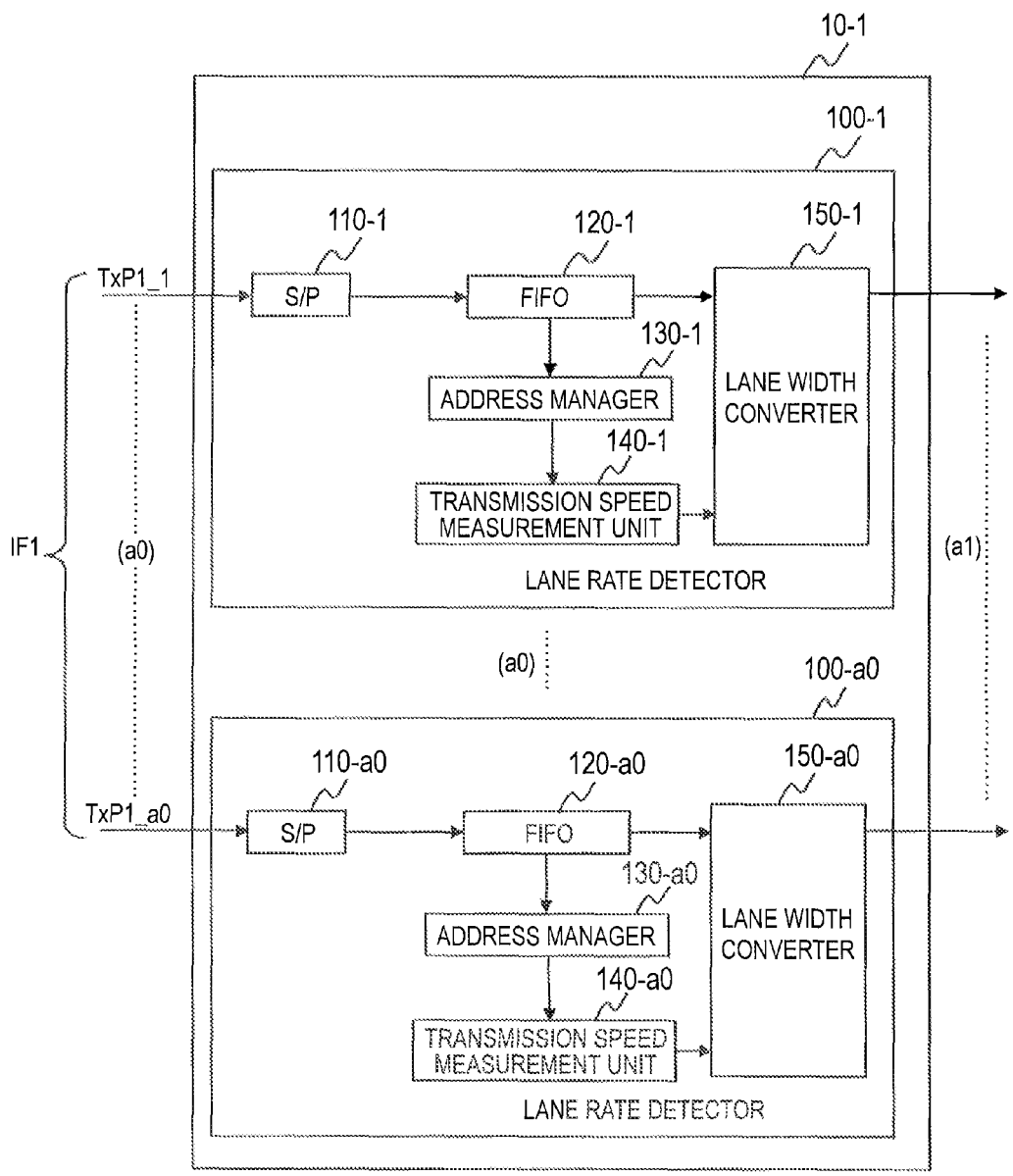
FIG. 2 is a block diagram illustrating a configuration example of a rate detector in a transmitter in Embodiment 1.

FIG. 2 schematically illustrates a configuration of the rate detector 10-1 in the transmitter 1 of this embodiment. The other rate detectors have the same configuration. However, the number of input lanes and the number of output lanes depend on the rate detector.

The rate detector 10-1 detects the transmission data rate of the interface IF1. The rate detector 10-1 includes lane rate detectors 100-1 to 100-a0 individually associated with the a0 input lanes (TxP1_1 to TxP1_a0). The lane rate detectors 100-1 to 100-a0 each receive serial data.

The lane rate detector 100-1 includes a serial/parallel (S/P) converter 110-1, a FIFO (First In, First Out) unit 120-1, an address manager 130-1, a transmission speed measurement unit 140-1, and a lane width converter 150-1. The other lane rate detectors have the same configuration. For example, the lane rate detector 100-a0 includes a serial/parallel (S/P) converter 110-a0, a FIFO unit 120-a0, an address manager 130-a0, a transmission speed measurement unit 140-a0, and a lane width converter 150-a0.

The serial/parallel converter 110-1 converts serial data from the input lane TxP1_1 into parallel data and outputs it to the FIFO unit 120-1. For example, the serial/parallel converter 110-1 generates 32 parallel bit data from received 32 serial bit data and outputs it.

The FIFO unit 120-1 includes an internal FIFO controller and a FIFO memory. The internal FIFO controller (FIFO unit 120-1) writes (stores) parallel data from the serial/parallel converter 110-1 to the FIFO memory synchronously with write reference clocks.

The internal FIFO controller retrieves data from the FIFO memory synchronously with read reference clocks and outputs it to the lane width converter 150-1. In this example, the internal FIFO controller converts parallel data held in the FIFO memory from parallel to parallel and outputs the result. For example, the internal FIFO controller generates 64 parallel bit data by combining 32 parallel bit data held in the FIFO memory and outputs it.

The internal FIFO controller checks the amount of data remaining in the FIFO memory in retrieving data from the FIFO memory. If the amount of remaining data of the user data held in the FIFO memory is equal to or less than a predetermined lower threshold (the lower threshold may be 0), the internal FIFO controller notifies the address manager 130-1 that the FIFO memory is in an underflow state.

If the amount of remaining data of the user data held in the FIFO memory is equal to or more than a predetermined upper threshold which is higher than the lower threshold, the internal FIFO controller notifies the address management 130-1 that the FIFO memory is in an overflow state.

The address manager 130-1 saves the foregoing notifications of abnormal state. The address manager 130-1 may notify the administrator of the abnormal state automatically or in response to a request from the administrator.

The internal FIFO controller further controls the cycle (frequency) of reading from the FIFO memory based on the amount of remaining data in the FIFO memory. This approach achieves speedy and appropriate control of read frequency. In this example, the cycle (frequency) of writing to the FIFO memory is fixed. Also, the cycle of writing to the FIFO memory is common to all the lane rate detectors 100-1 to 100-a0.

The internal FIFO controller checks the amount of data remaining in the FIFO memory in retrieving data from the FIFO memory. If the amount of remaining data is in a predetermined middle range, the internal FIFO controller retrieves data from the FIFO memory at the current read cycle (for example, at every 6 read reference clock cycles) and outputs it. The middle range is a range including the half value of the FIFO memory capacity. Further, the middle range is between a predetermined first threshold and a predetermined second threshold, which is larger than the first threshold.

If the amount of remaining data is less than the first threshold, the internal FIFO controller lengthens the cycle of reading from the FIFO memory from the current one (lowers the read frequency). For example, the internal FIFO controller retrieves data from the FIFO memory at every 8 read reference clock cycles and outputs it.

If the amount of remaining data is more than the second threshold, the internal FIFO controller shortens the cycle of reading from the FIFO memory than the current one (raises the read frequency). For example, the internal FIFO controller retrieves data from the FIFO memory at every 4 read reference clock cycles and outputs it.

As described above, the internal FIFO controller adjusts the read cycle depending on the amount of remaining data in the FIFO memory. The internal FIFO controller may use more thresholds to vary the amount of change in cycle depending on the difference between the amount of remaining data and the half value of the memory capacity.

The control of the read cycle may be performed by the address manager 130-1. In either configuration, the address manager 130-1 and the internal FIFO controller constitute the controller of the FIFO unit 120-1.

The address manager 130-1 acquires the current amount of remaining data in the FIFO unit 120-1 and the current value of the cycle of reading from the FIFO memory from the internal FIFO controller and manages them. If the amount of remaining data is in the predetermined middle range, the address manager 130-1 notifies the transmission speed measurement unit 140-1 of the value of the read cycle at this amount of remaining data.

The transmission speed measurement unit 140-1 determines the transmission speed (meaning the transmission data rate) of the interface IF1 with reference to the acquired value of the read cycle (the number of read reference clock cycles per cycle). The transmission speed measurement unit 140-1 has beforehand information associating the value of the read cycle with the transmission speed.

For example, the transmission speed measurement unit 140-1 determines which of high speed, middle speed, and low speed the transmission speed of the interface IF1 is with reference to the acquired value of the read cycle. The read frequency (read cycle) of the FIFO unit 120-1 in the middle range reflects the transmission data rate of the interface IF1; the transmission speed measurement unit 140-1 can detect the transmission data rate of the interface IF1 from this value.

The transmission speed measurement unit 140 determines the number of lanes (used lanes) to be used in transporting data from the lane width converter 150-1 in accordance with the determined transmission speed. For example, if the transmission speed is the middle speed, the transmission speed measurement unit 140-1 determines the number of used lanes is 2; if the transmission speed is the low speed, it determines the number of used lanes is 1; and if the transmission speed is the high speed, it determines the number of used lanes is 3. The transmission speed measurement unit 140-1 notifies the lane width converter 150-1 of the determined number of used lanes.

In this way, the transmission speed measurement unit 140-1 can measure (estimate) the transmission speed (transmission data rate) of the IF with reference to the varying FIFO operation cycle and amount of remaining data in the FIFO memory. Furthermore, the determination of the number of used lanes depending on the transmission speed results in reduction in invalid data generation. However, the number of used lanes may be fixed.

The lane width converter 150-1 checks for data from the FIFO unit 120-1 at a predetermined cycle. The lane width converter 150-1 checks whether data from the FIFO unit 120-1 exists at the read reference clock cycle of the FIFO unit 120-1. If some data has been output from the FIFO unit 120-1, the lane width converter 150-1 receives and takes in the data from the FIFO unit 120-1. Controlling the read frequency of the FIFO unit 120-1 in accordance with constant read reference clocks keeps the input frequency to the lane width converter 150-1 to be fixed.

If no data has been output from the FIFO unit 120-1, the lane width converter 150-1 generates invalid data. As described previously, the data sent from the FIFO unit 120-1 is valid data from the interface IF1, In the case where the lane width converter 150-1 receives 64-bit parallel data from the FIFO unit 120-1 like in the foregoing example, the lane width converter 150-1 generates 64-bit invalid data.

The rate detectors 10-1 to 10-n process bit strings; their processing does not depend on the configurations of the data frames in the protocols of the input interfaces IF1 to IFn. The rate detectors 10-1 to 10-n add invalid data to valid data to absorb the differences in transmission data rate among input interfaces IF1 to IFn. By adding invalid data, the rate detectors 10-1 to 10-n can send valid data to the virtual lane converter 20 via the transmission lanes having the same transmission data rate.

The lane width converter 150-1 generates data blocks from received valid data and generated invalid data in the sequential order of data acquisition (receiving valid data and generating invalid data). One data block consists of only either valid data bits or invalid data bits. An invalid data block has a predetermined bit pattern.

The lane width converter 150-1 outputs a data block (serial bit string) to a used lane at a predetermined cycle. For example, each data block has a size of 64 bits and each used lane serially sends the 64-bit blocks. In another example, each data block may have a size of an integral multiple or an integral submultiple of the size of the parallel data of the FIFO unit 120-1.

In this example, the cycles of outputting and inputting (including generating invalid data) of all the lane width converters 150-1 to 150-a0 are the same (the frequencies are the same and synchronous). That is to say, the timing of checking for data output from the FIFO units is the same as the timing of outputting data to the virtual lane converter 20 in the lane width converters 150-1 to 150-a0. The same applies to the lane width converters in the other rate detectors 10-2 to 10-n. In addition, the cycles of outputting and inputting (including generating invalid data) of the lane width converters of all the rate detectors 10-1 to 10-n are the same.

The lane rate detectors 100-1 to 100-a0 individually and independently control the FIFO unit 120-1 to 120-a0; as a result, however, all the FIFO units 120-1 to 120-a0 in the lane rate detectors 100-1 to 100-a0 operate in the same way. In the foregoing example, each lane rate detector independently controls the FIFO unit and lane width converter; but one of the address managers or one of the transmission speed measurement units may control the operation of all lane rate detectors in the same way (with the same control data) with reference to the data from one of the FIFO units.

Figure 3:
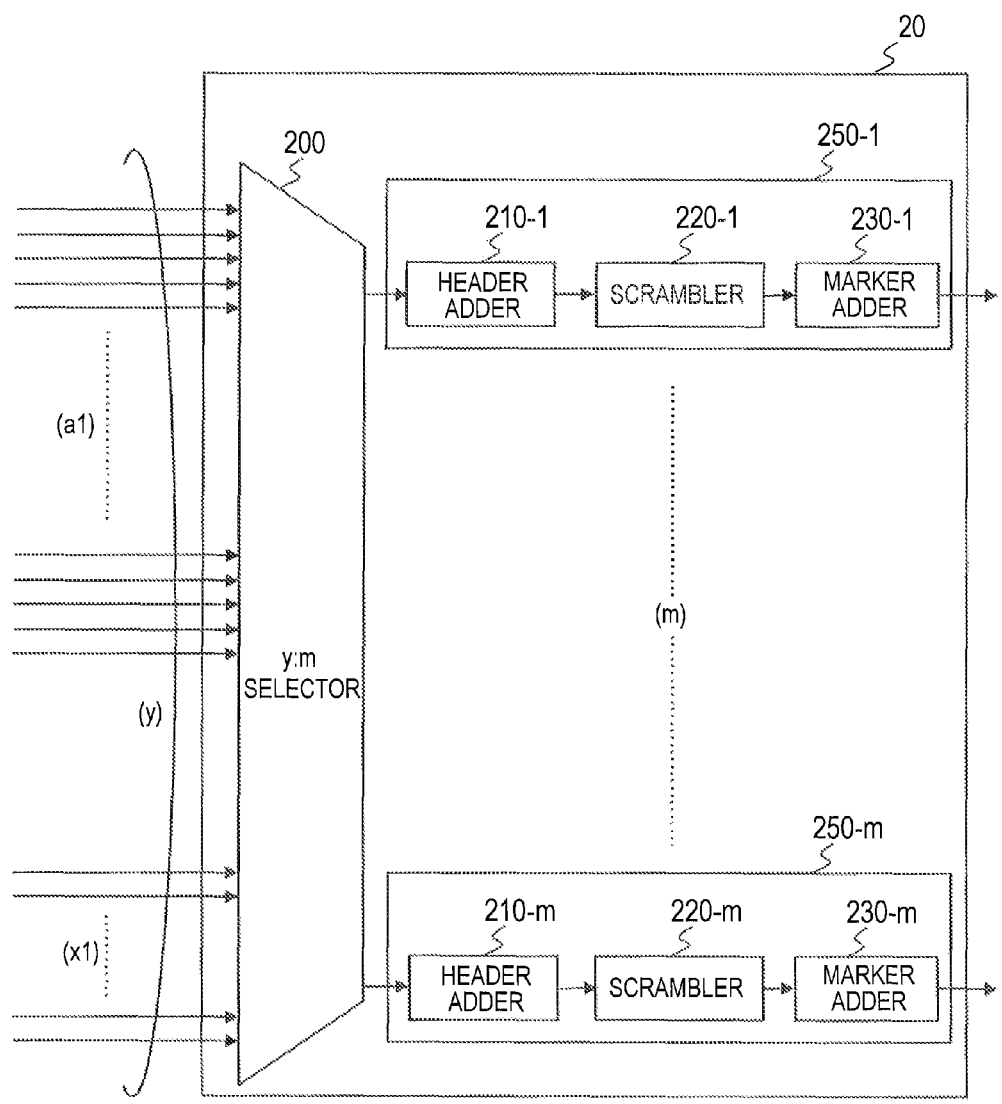
FIG. 3 is a block diagram illustrating a configuration example of a virtual lane converter in the transmitter in Embodiment 1.

FIG. 3 is a block diagram schematically illustrating a configuration example of the virtual lane converter 20. The virtual lane converter 20 shown in FIG. 3 includes a selector 200 and unit composers 250-1 to 250-m. FIG. 3 illustrates only the unit composers 250-1 to 250-m associated with the used lanes, and specifically illustrates only the unit composers 250-1 and 250-m.

The unit composer 250-1 includes a header adder 210-1, a scrambler 220-1, and a marker adder 230-1. The other unit composers have the same configuration; for example, the unit composer 250-m includes a header adder 210-m, a scrambler 220-m, and a marker adder 230-m.

The selector 200 selects the used lanes out of the transmission lanes from the rate detectors 10-1 to 10-n and transfers data blocks received from the used lanes to the unit composers 250-1 to 250-m. As previously mentioned, the number of used lanes is m.

The unit composers 250-1 to 250-m compose data units including received data by a predetermined method. The unit composers 250-1 to 250-m output composed data units to the multiplexer 30. The virtual lane converter 20 can compose data units suitable for data transport through the transmission channel composed of the L transmission lanes.

In this example, one data unit includes one or more data blocks from lane width converters. In the following description, one data unit consists of one data block (a 64-bit data block in the foregoing example) and management data.

One data unit may include only user data having a size smaller than the foregoing data block or include a data block from a different used lane. The management data included in the data unit includes information identifying the lane transporting the data block. The number of used unit composers does not need to be equal to the number of used lanes.

The header adder 210-1 adds a header for identifying the beginning of the data unit. The scrambler 220-1 performs scrambling for ensuring the DC balancing and the run length on the user data block. The marker adder 230-1 adds a marker typically used in Ethernet. The header and the marker are management data of the data unit. The other unit composers perform the same processing.

This example can determine the processing of the virtual lane converter 20 independently from the protocol of the input IF or the transmission data rate; the virtual lane converter 20 can perform the same processing on data transmitted at different data rates. The method of composing a data unit does not need to be specified by some standard and is not limited to a particular one.

[Detailed Configuration and Operations of Receiver]

Figure 4:
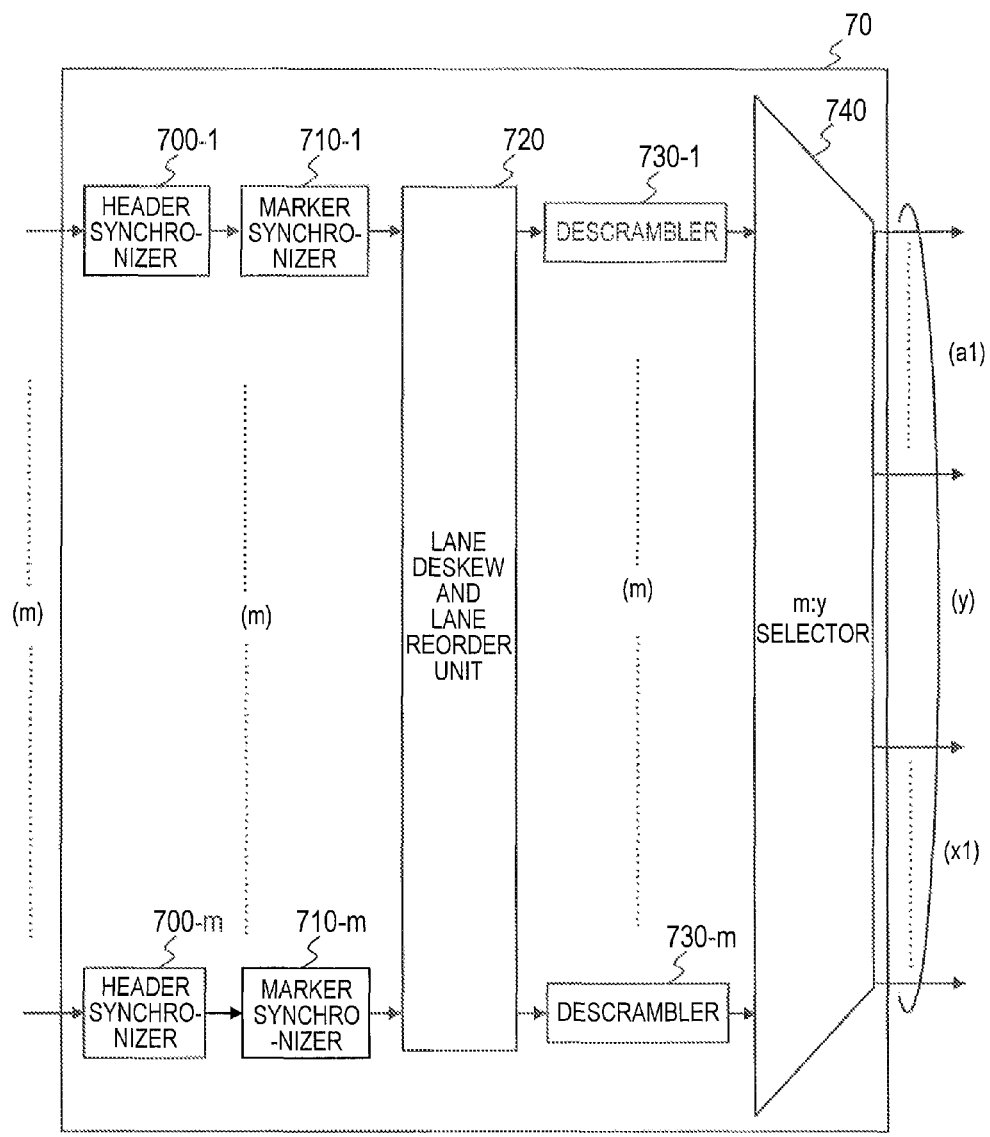
FIG. 4 is a block diagram illustrating a configuration example of a physical link converter in a receiver in Embodiment 1.

Hereinafter, a configuration and operations of the receiver 2 will be described. FIG. 4 is a block diagram schematically illustrating a configuration example of the physical link converter 70 in the receiver 2. The physical link converter 70 includes header synchronizers 700-1 to 700-m, marker synchronizers 710-1 to 710-m, a lane deskew and lane reorder unit 720, descramblers 730-1 to 730-m, and a selector 740.

The physical link converter 70 receives data units from the demultiplexer 60 via the m transmission lanes. As previously described, the number m is the number of used lanes in the transmitter 1 and is variable. The physical link converter 70 acquires user data from data units composed by the virtual lane converter 20 in the transmitter 1.

Specifically, the header synchronizers 700-1 to 700-m detect headers included in data units, synchronizes the headers and output the data units to the marker synchronizers 710-1 to 710-m. The marker synchronizers 710-1 to 710-m detect markers included in the data units and output the data units to the lane deskew and lane reorder unit 720.

The lane deskew and lane reorder unit 720 adjusts skews (delays) among the lanes with the synchronized markers to eliminate the differential delay. Furthermore, the lane deskew and lane reorder unit 720 determines the transmission lane for each data unit with reference to the header or the marker. As described above, the header or the marker includes information identifying the transmission lane (used lane from the lane width converter) of the data block in the data unit.

The lane deskew and lane reorder unit 720 extracts data blocks (user data) from data units and outputs them to the descramblers 730-1 to 730-m individually associated with the used lanes of the data blocks. The data from the descramblers 730-1 to 730-m is output through the associated output lanes from the physical link converter 70.

The descramblers 730-1 to 730-m restore data blocks scrambled in the transmitter 1 and output them to the selector 740. The selector 740 selects the m input lanes outputting the data (data from the descramblers 730-1 to 730-m) out of all input lanes to output the received data blocks through the output lanes individually associated with the m input lanes. It should be noted that a different function block, such as the selector 740, may determine the output lane for a data block and remove the management data from the data unit.

Figure 5:
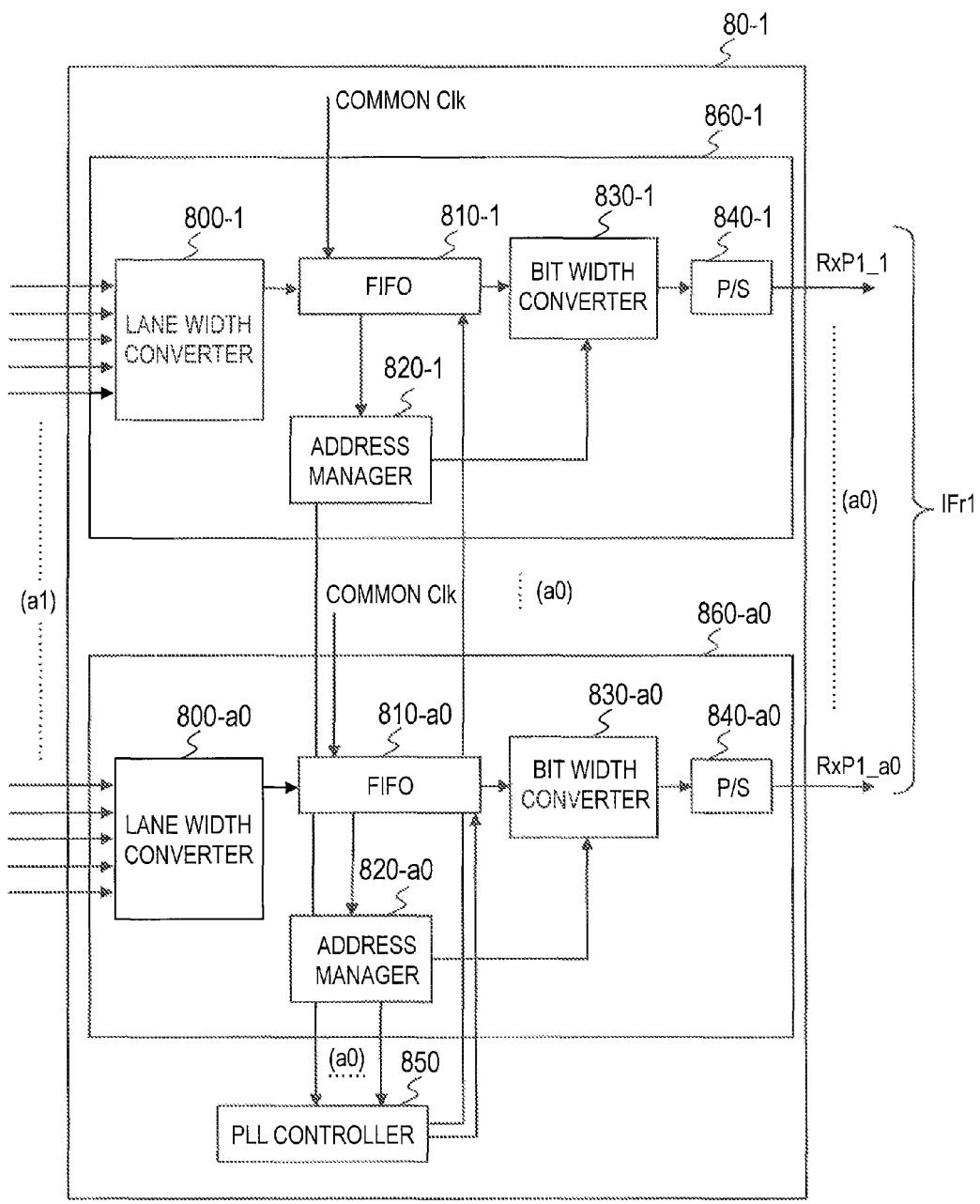
FIG. 5 is a block diagram illustrating a configuration example of a rate recovery unit in the receiver in Embodiment 1.

FIG. 5 is a block diagram schematically illustrating a configuration example of the rate recovery unit 80-1 in the receiver 2. The other rate recovery units have the same configuration. The rate recovery unit 80-1 shown in FIG. 5 includes lane rate recovery units 860-1 to 860-a0 and a PLL controller 850.

The lane rate recovery unit 860-1 includes a lane width converter 800-1, a FIFO unit 810-1, an address manager 820-1, a bit width converter 830-1, and a parallel/serial (P/S) converter 840-1. The bit width converter 830-1 enables the lane rate recovery unit 860-1 to process signals having various configurations (for example, various bit widths in the FIFO unit) from the lane rate detector. The bit width converter 830-1 may be omitted if the input bit width and the output bit width of the FIFO unit in a lane rate recovery unit are the same as the output bit width and the input bit width of the FIFO unit in the lane rate detector.

The other lane rate recovery units have the same configuration. For example, the lane rate recovery unit 860-a0 includes a lane width converter 800-a0, a FIFO unit 810-a0, an address manager 820-a0, a bit width converter 830-a0, and a parallel/serial (P/S) converter 840-a0.

The rate recovery units 80-1 to 80-n receive data blocks via the associated transmission lanes connected among the y transmission lanes. For example, the number of lanes associated with the rate recovery unit 80-1 is a1 and the number of lanes associated with the rate recovery unit 80-n is x1. Furthermore, the rate recovery units 80-1 to 80-n receive data (data blocks) only from the used lanes among the associated transmission lanes.

Hereinafter, the operations of the rate recovery unit 80-1 are described. The same applies to the operations of the other rate recovery units. The lane width converter 800-1 receives data from the physical link converter 70 via the associated transmission lanes. As described above, the lane width converter 800-1 receives data blocks from the lanes associated with the used lanes selected in the transmitter 1 among the a1 transmission lanes.

The lane width converter 800-1 selects valid data blocks from the received data blocks and sorts the valid data blocks in the sequential order. Since invalid data blocks have a unique pattern, the lane width converter 800-1 can select valid data blocks with reference to the patterns of the data blocks.

The relations (rules) between the sequence of the data blocks and the input transmission lanes are predetermined. They are shared by the lane width converter 150-1 in the transmitter 1 and the lane width converter 800-1 in the receiver 2.

The lane width converter 800-1 outputs valid data to the FIFO unit 810-1 in accordance with the sequential order. The number of transmission lanes between the lane width converter 800-1 and the FIFO unit 810-1 may be 64 and is equal to the number of transmission lanes between the FIFO unit and the lane width converter in the transmitter 1. However, these numbers may be different values.

The FIFO unit 810-1 receives data from the lane width converter 800-1 synchronously with the write reference clocks. In the example described below, the write cycle is fixed. The write reference clocks are common to all lane rate recovery units 860-1 to 860-a0 and the write cycles are the same. In one example, the write reference clocks are common to the FIFO units of all rate recovery units 80-1 to 80-n and the write cycles are the same.

In the FIFO unit 810-1, the data received from the lane width converter 800-1 is stored in the FIFO memory. The internal FIFO controller retrieves data retained in the FIFO memory synchronously with the clock signal generated at the PLL controller 850 and sends it to the bit width converter 810-1. In this example, the number of input parallel bits in the FIFO unit 810-1 is equal to the number of output parallel bits; but they may be different.

In retrieving data from the FIFO memory, the internal FIFO controller checks the amount of data remaining in the FIFO memory and notifies the address manager 820-1 of it.

The address manager 820-1 controls the read frequency of the FIFO unit 810-1 based on the amount of remaining data in the FIFO memory. The number of clock signal cycles included in a read cycle is fixed; the address manager 820-1 controls the frequency of the clock signal from the PLL controller 850 to control the read frequency. This control will be described later.

The address manager 820-1 instructs the PLL controller 850 to change the clock signal frequency. The PLL controller 850 generates clock signals to determine the read frequency in accordance with the information received from the address manager 820-1 and supplies the clock signals to the FIFO unit 810-1. Although the PLL controller 850 sends independent clock signals (read frequency signals) to the lane rate recovery unit 860-1 to 860-a0, the resultant frequencies of the clock signals are the same.

The address manager 820-1 determines the output bit width in the bit width converter 830-1 based on the write cycle to the FIFO unit 810-1 and notifies the bit width converter 830-1 of it. This operation will be described later.

The bit width converter 830-1 converts the bit width of the input data into the specified bit width and forwards the data to the parallel/serial converter 840-1. The parallel/serial converter 840-1 converts the received parallel data into serial data and outputs it to the output lane RxP1_1.

Figure 6:
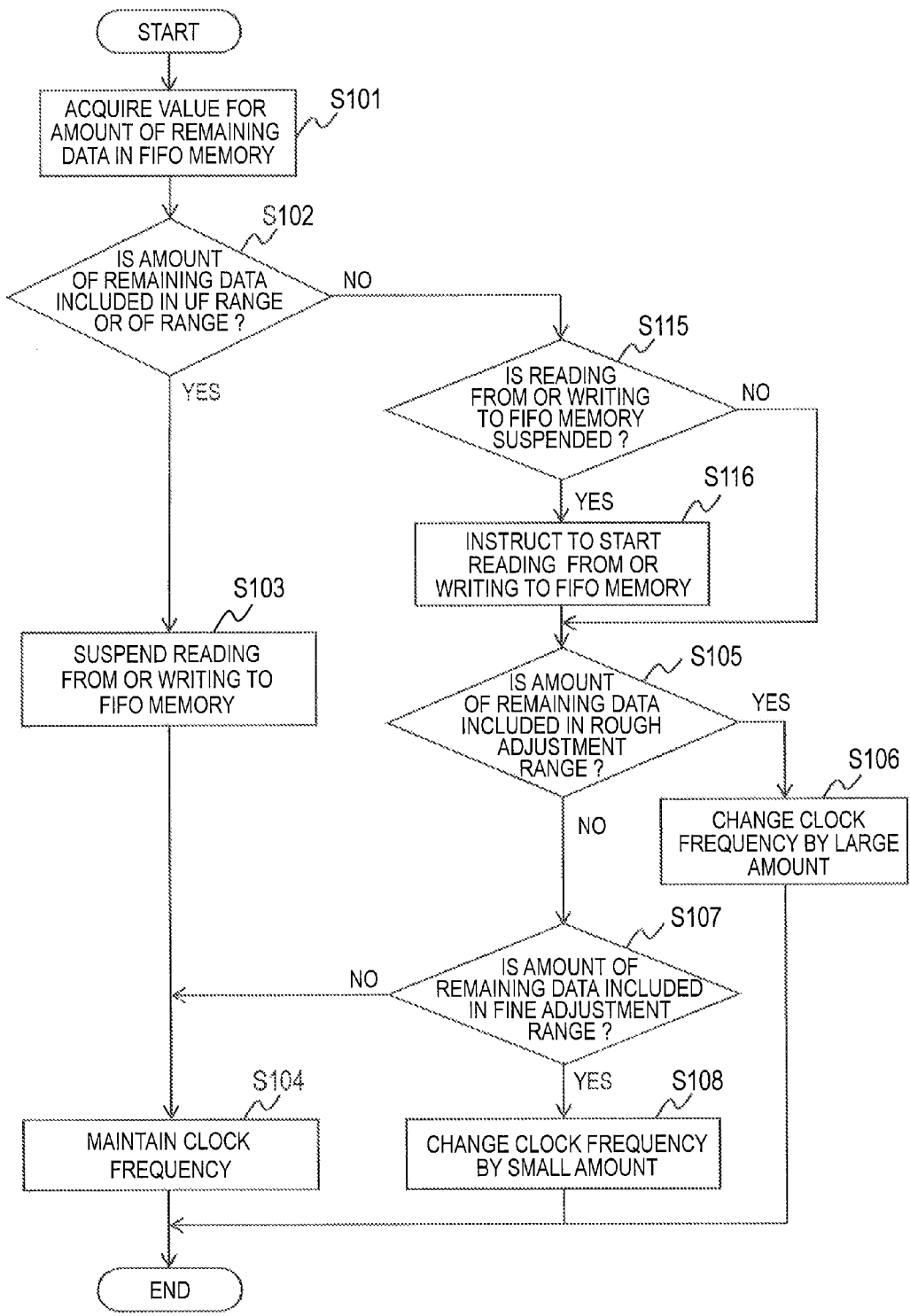
FIG. 6 is a flowchart illustrating processing of the rate recovery unit to change read frequency in the receiver in Embodiment 1.
Figure 7:
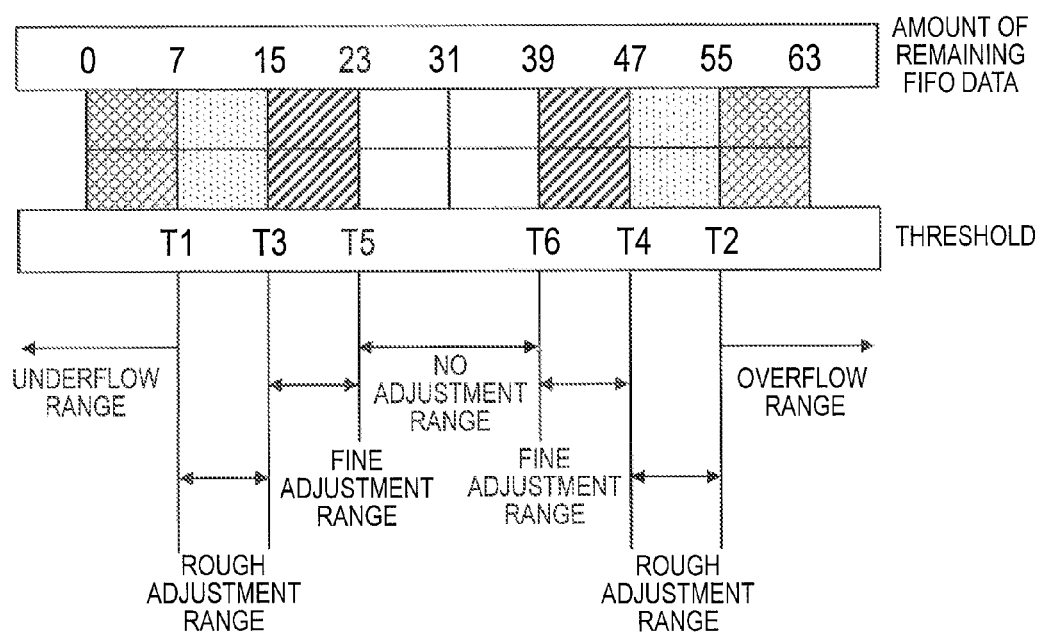
FIG. 7 is a diagram illustrating an example of the relationship between the amount of FIFO remaining data and the range for changing the read frequency in the receiver in Embodiment 1.

Now with reference to FIGS. 6 and 7, a method of controlling the read frequency of the FIFO unit, specifically, a method of controlling the clock frequency in reading from the FIFO unit is described. FIG. 6 is a flowchart for read frequency control in the lane rate recovery unit 860-1. The other lane rate recovery units 860-2 to 860-a0 operate in accordance with the same flowchart.

FIG. 7 illustrates the relationship between the amount of FIFO remaining data and the amount of adjustment of clock frequency to be the reference in the read frequency control. In FIG. 7, thresholds T1 to T6 are the thresholds for the amount of remaining data in the FIFO memory and are in the relation of T1<T3<T5<T6<T4<T2. Each threshold is included in one of the ranges. The range lower than the threshold T1 is called an underflow (UF) range and the range higher than the threshold T2 is called an overflow (OF) range.

The range between the thresholds T1 and T3 is called a rough adjustment range on the underflow side. The range between the thresholds T3 and T5 is called a fine adjustment range on the underflow side. The range between the thresholds T5 and T6 including the half value is called a no adjustment range. The range between the thresholds T6 and T4 is called a fine adjustment range on the overflow side. The range between the thresholds T4 and T2 is called a rough adjustment range on the overflow side.

If the amount of remaining data is included in the underflow range, the address manager 820-1 suspends reading from the FIFO unit 810-1 without changing the clock frequency. If the amount of remaining data is included in the rough adjustment range on the underflow side, the address manager 820-1 lowers the clock frequency by a predetermined amount.

If the amount of remaining data is included in the fine adjustment range on the underflow side, the address manager 820-1 lowers the clock frequency by a predetermined amount. This amount of change is smaller than the amount of change in the case of the rough adjustment range on the underflow side. As a result, the clock frequency (read frequency) can be controlled appropriately depending on the amount of deviation from the reference value so that the amount of remaining data will soon be in the no adjustment range.

If the amount of remaining data is included in the no adjustment range, the address manager 820-1 maintains the current clock frequency without change. If the amount of remaining data is included in the fine adjustment range on the overflow side, the address manager 820-1 raises the clock frequency by a predetermined amount.

If the amount of remaining data is included in the rough adjustment range on the overflow side, the address manager 820-1 raises the clock frequency by a predetermined amount. This amount of change is larger than the amount of change in the fine adjustment range on the overflow side. If the amount of remaining data is included in the overflow range, the address manager 820-1 suspends writing to the FIFO unit 810-1 without changing the clock frequency.

With reference to FIG. 6, FIFO control by the address manager 820-1 is described. The FIFO unit 810-1 and the address manager 820-1 repeat the processing of the flowchart of FIG. 6 at the read frequency of the FIFO unit.

The address manager 820-1 acquires a value indicating the amount of data currently remaining in the FIFO memory from the FIFO unit 810-1 at the time of reading the FIFO unit 810-1 (at the time to read in the case where reading is suspended) (S101). The address manager 820-1 determines which range includes the amount of remaining data among the ranges shown in FIG. 7.

If the amount of remaining data is included in the underflow range (<T1) or the overflow range (>T2) (YES at S102), the address manager 820-1 instructs the FIFO unit 810-1 to suspend reading or writing (S103). The address manager 820-1 maintains the clock frequency without change (S104).

If the amount of remaining data is not included in the underflow range or the overflow range (NO at S102), the address manager 820-1 determines whether reading or writing by the FIFO unit 810-1 is suspended (S115). The FIFO unit 810-1 starts reading or writing (S116).

If the amount of remaining data is included in the rough adjustment range on the underflow side (between T1 and T3) or the rough adjustment range on the overflow side (between T4 and T2) (NO at S102 and YES at S105), the address manager 820-1 lowers or raises the clock frequency by a large amount (S106).

If the amount of remaining data is included in the fine adjustment range on the underflow side (between T3 and T5) or the fine adjustment range on the overflow side (between T6 and T4) (NO at S105 and YES at S107), the address manager 820-1 lowers or raises the clock frequency by a small amount (S108). If the amount of remaining data is included in the no adjustment range (between T5 and T6) (NO at S107), the address manager 820-1 determines that the clock frequency is a clock frequency appropriate for the interface IF1 (IFr1) and maintains the clock frequency without change (S104).

When the amount of remaining data is included in the no adjustment range, the transmission data rate for valid data to the FIFO unit 810-1 is balanced with the transmission data rate from the FIFO unit 810-1 and the read frequency is at a value consistent with the transmission data rate of the interface IF1.

The foregoing determination of the range including the amount of remaining data may be performed by the internal FIFO controller in the FIFO unit 810-1. The address manager 820-1 acquires the result of determination from the FIFO unit 810-1 to control the PLL controller 850.

Figure 8:
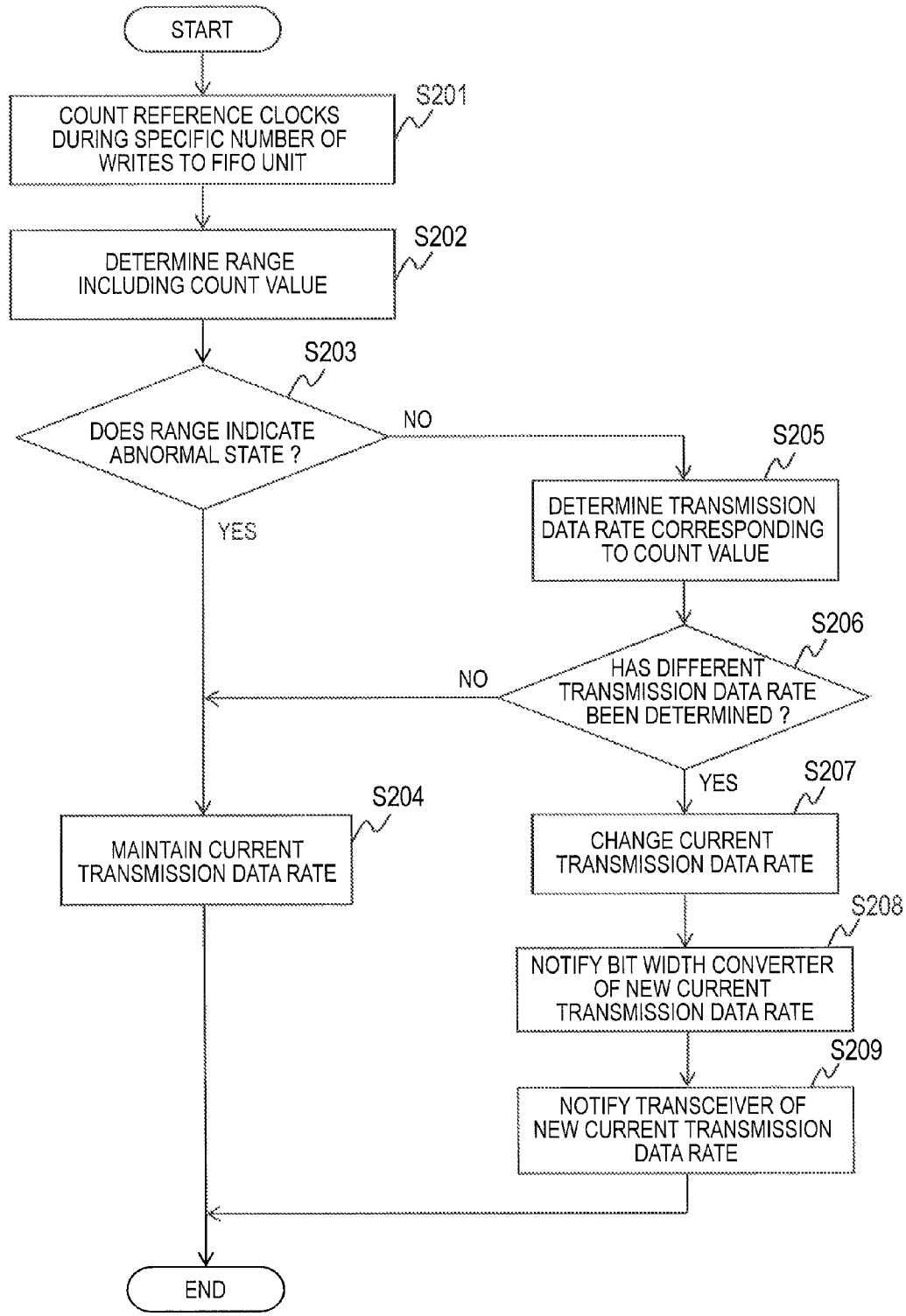
FIG. 8 is a flowchart illustrating processing of the rate recovery unit to recover a transmission data rate in the receiver in Embodiment 1.

Next, with reference to FIGS. 8 and 9, recovery (estimation) of the transmission data rate of the interface IF1 (the transmission data rate of the interface IFr1) is described. The other rate recovery units perform the same process ng. The processing described below is performed by each lane rate recovery unit in the rate recovery unit 80-1. The estimated transmission data rates are the same among the lane rate recovery units. The following description is about the processing of the lane rate recovery unit 860-1.

FIG. 8 is a flowchart illustrating the processing of the lane rate recovery unit 860-1 and FIG. 9 is a diagram illustrating the relationship between the write cycle in the FIFO unit 810-1 and the transmission data rate of the interface IFr1 (IF1).

The write cycle is a value determined by the frequency of write reference clock for the FIFO unit, the bit width in writing to the FIFO unit, and the transmission data rate in writing data to the FIFO unit. For example, in the case where the reference clock frequency is 176.5625 MHz and the bit width is 96 bits, the write cycle is defined as ((176.5625× 96=16.95 Gbps)/transmission data rate [Gbps]).

The write cycle represents the number of reference clock cycles required for one write operation to the FIFO unit in writing data transmitted at some transmission data rate [Gbps] to the FIFO unit. The transmission data rate of some input data to the FIFO unit is calculated from the value of the write cycle, the frequency of reference clock in writing to the FIFO unit, and the bit width to write to the FIFO unit.

For example, assuming that the reference clock frequency is 176.5625 MHz, the bit width is 96 bits, and the transmission data rate is 1.0625 Gbps, the value of the write cycle is 15.95. In this example, the number of reference clock cycles counted during 100 times of writing to the FIFO is 1595.

If the transmission data rate is high, the bits for a write to the FIFO unit can be received in a short time period; accordingly, the value of the write cycle (the number of reference clock cycles between the previous write and this write) is small. This example obtains the write cycle of the FIFO unit to determine the transmission data rate for valid data or the transmission data rate of the interface IF1. Through this operation, the transmission data rate can be estimated speedily and appropriately.

This example determines the transfer data rate in accordance with the information shown in FIG. 9. The lane rate recovery unit 860-1 counts (measures) the write reference clocks in 100 writes to the FIFO memory. The lane rate recovery unit 860-1 compares the obtained value of the write cycle with the values in the rate threshold column to determine which range includes the count value.

In the example of FIG. 9, a pair of two adjacent rate thresholds defines a range. For example, if the clock count is included in the range from 136 or more to less than 163, the lane rate recovery unit 860-1 determines that the transmission data rate is 10.51875. If the clock count is included in the range from 163 or more to less than 167, the lane rate recovery unit 860-1 determines that the transmission data rate is 10.3125. If the clock count is less than 136 or not less than 1792, the lane rate recovery unit 860-1 determines that the state is abnormal.

With reference to the flowchart of FIG. 8, a method of determining the transmission data rate is described. The lane rate recovery unit 860-1 performs the processing of the flowchart of FIG. 8 every 100 data writes to the FIFO unit 810-1. The internal FIFO controller in the FIFO unit 810-1 counts the write reference clock cycles during the predetermined number (100 in the example of FIG. 9) of writes to the FIFO memory and sends the count value to the address manager 820-1 (S201).

The address manager 820-1 compares the count value received from the internal FIFO controller with the rate thresholds held in advance (refer to FIG. 9) to determine the range including the write cycle of the predetermined number of data writes to the FIFO unit 810 (S202).

If the count value is included in the range indicating an abnormal state of high-speed or low-speed (YES at S203), the address manager 820-1 saves the record of detection of an abnormal state without changing the current transmission data rate (S204). The address manager 820-1 may notify the administrator of the abnormal state automatically or in response to a request of the administrator.

If the count value is out of the range indicating an abnormal state (NO at S203), the address manager 820-1 determines the transfer data rate corresponding to the range including the count value (S205). As explained with reference to FIG. 9, the address manager 820-1 has beforehand information associating the range including the count value with the transfer data rate.

The address manager 820-1 determines whether the transmission data rate indicated by the count value is different from the current transmission data rate (S206). The address manager 820-1 has a memory holding the transmission data rate determined at the previous measurement. The address manager 820-1 compares the transmission data rate measured this time with the value of the transmission data rate in the memory.

If the new transmission data rate is not different from the current one (NO at S206), the address manager 820-1 maintains the transmission data rate held in the memory (S204). If the new transmission data rate is different from the current one (YES at S206), the address manager 820-1 changes the value of the transmission data rate held in the memory (S207).

The address manager 820-1 notifies the bit width converter 830-1 of the value of the new transmission data rate (S208). The bit width converter 830-1 has beforehand information associating the transfer data rate with the bit width. The bit width converter 830-1 converts the bit width of received data into the bit width corresponding to the specified transmission data rate. Specifically, a wider bit width is associated with a higher transmission data rate so that the output data rate from the parallel/serial converter 840-1 increases as the input bit width increases.

The transmission data rate of the data sent from the bit width converter 830-1 via the parallel/serial converter 840-1 is the same as the transmission data rate of the input from the interface IF1 in the transmitter 1 to the rate detector 10-1; the transmission data rate at the corresponding input interface IF1 in the transmitter 1 is recovered.

Further, the address manager 820-1 notifies the transceiver for the interface IFr1 of the value of the new transmission data rate. The transceiver is connected ahead of the transmission lanes RxP1_1 to RxP1_a0 and transports data at the specified transmission data rate.

It should be noted that one address manager may control the FIFO units and the bit width converters of all the lane rate recovery units with reference to data from one FIFO unit. The address manager in each lane rate recovery unit may control the bit width converter of the same lane rate recovery unit and only one address manager may notify the transceiver of the estimated transmission data rate.

The data transport method and the data transport device in this embodiment enable multiplexing/demultiplexing data transmitted from/to a plurality of interfaces using different protocols and different transmission data rates. Since the data transport device of this example can be constructed with a single circuit, a compact large-throughput and low-delay data transport device supporting multiple rates can be provided.

As described above, the transmitter multiplexes transmission data of a plurality of interfaces and inserts management information to compose units of data (perform virtual lane conversion). The transmitter outputs the units to a high-speed transmission channel. The receiver splits multiplex data received from the high-speed transmission channel and stores the data to the FIFO memory. The receiver recovers clock signals for reading from FIFO memory based on the amount of remaining data in the FIFO memory at the PLL controller.

This way, the internal operations in the transmitter and the receiver of this embodiment are not affected by the type of the transported data or the protocol. This embodiment can guarantee the processing time for signals of different protocols to achieve low delay in transport time.

Embodiment 2

Now, a data transport system of Embodiment 2 is described with reference to FIGS. 10 to 12. The following description mainly describes differences from Embodiment 1. First, with reference to FIGS. 10 and 11, a method of controlling clock frequency in reading from the FIFO unit is described.

Figure 11:
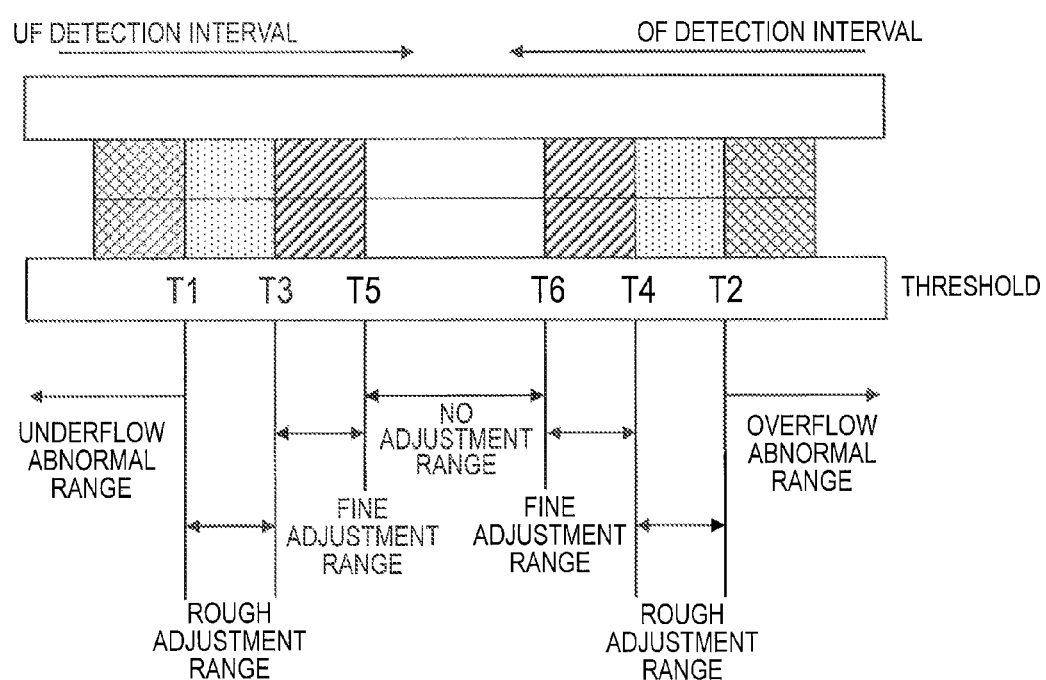
FIG. 11 is a diagram illustrating an example of the relationship between the FIFO overflow/underflow detection interval and the range for changing the read frequency in the receiver in Embodiment 2.

FIG. 11 illustrates the relationship between the underflow/overflow detection interval in the FIFO memory and the amount of adjustment of the clock frequency. In this example, the internal FIFO controller detects underflow/overflow and notifies the address manager 130 of it.

The internal FIFO controller determines that underflow has occurred if the amount of remaining data is a predetermined first threshold or less. The internal FIFO controller determines that an overflow has occurred if the amount of remaining data is not less than a predetermined threshold which is higher than the first threshold.

In FIG. 11, the thresholds T1, T3, and T5 are thresholds for the interval between detections of underflow and the thresholds T6, T4, and T2 are thresholds for the interval between detections of overflow. The thresholds are in relations of T1<T3<T5 and T6>T4>T2. Each threshold is included in one of the ranges.

The range lower than the threshold T1 is called an underflow (UF) abnormal range and the range lower than the threshold T2 is called an overflow (OF) abnormal range. The range between the thresholds T1 and T3 is called a rough adjustment range on the underflow side. The range between the thresholds T3 and T5 is called a fine adjustment range on the underflow side. The range higher than the threshold T5 and the range higher than the threshold T6 are called no adjustment ranges. The range between the thresholds T4 and T6 is called a fine adjustment range on the overflow side. The range between the thresholds T2 and T4 is called a rough adjustment range on the overflow side.

If the interval between detections of underflow is included in the underflow abnormal range, the address manager 8204 suspends reading from the FIFO unit 810-1 without changing the clock frequency. If the interval between detections of underflow is included in the rough adjustment range on the underflow side, the address manager 820-1 lowers the clock frequency by a predetermined amount.

If the interval between detections of underflow is included in the fine adjustment range on the underflow side, the address manager 820-1 lowers the clock frequency by a predetermined amount. This amount of change is smaller than the amount of change in the case of the rough adjustment range on the underflow side. If the interval between detections of underflow is included in the no adjustment range, the address manager 820-1 maintains the current clock frequency without change.

If the interval between detections of overflow is included in the no adjustment range, the address manager 820-1 maintains the current clock frequency without change. If the interval between detections of overflow is included in the fine adjustment range on the overflow side, the address manager 820-1 raises the clock frequency by a predetermined amount.

If the interval between detections of overflow is included in the rough adjustment range on the overflow side, the address manager 820-1 raises the clock frequency by a predetermined amount. This amount of change is larger than the amount of change in the fine adjustment range on the overflow side. If the interval between detections of overflow is included in the overflow abnormal range, the address manager 820-1 suspends writing to the FIFO unit 810-1 without changing the clock frequency.

Figure 10:
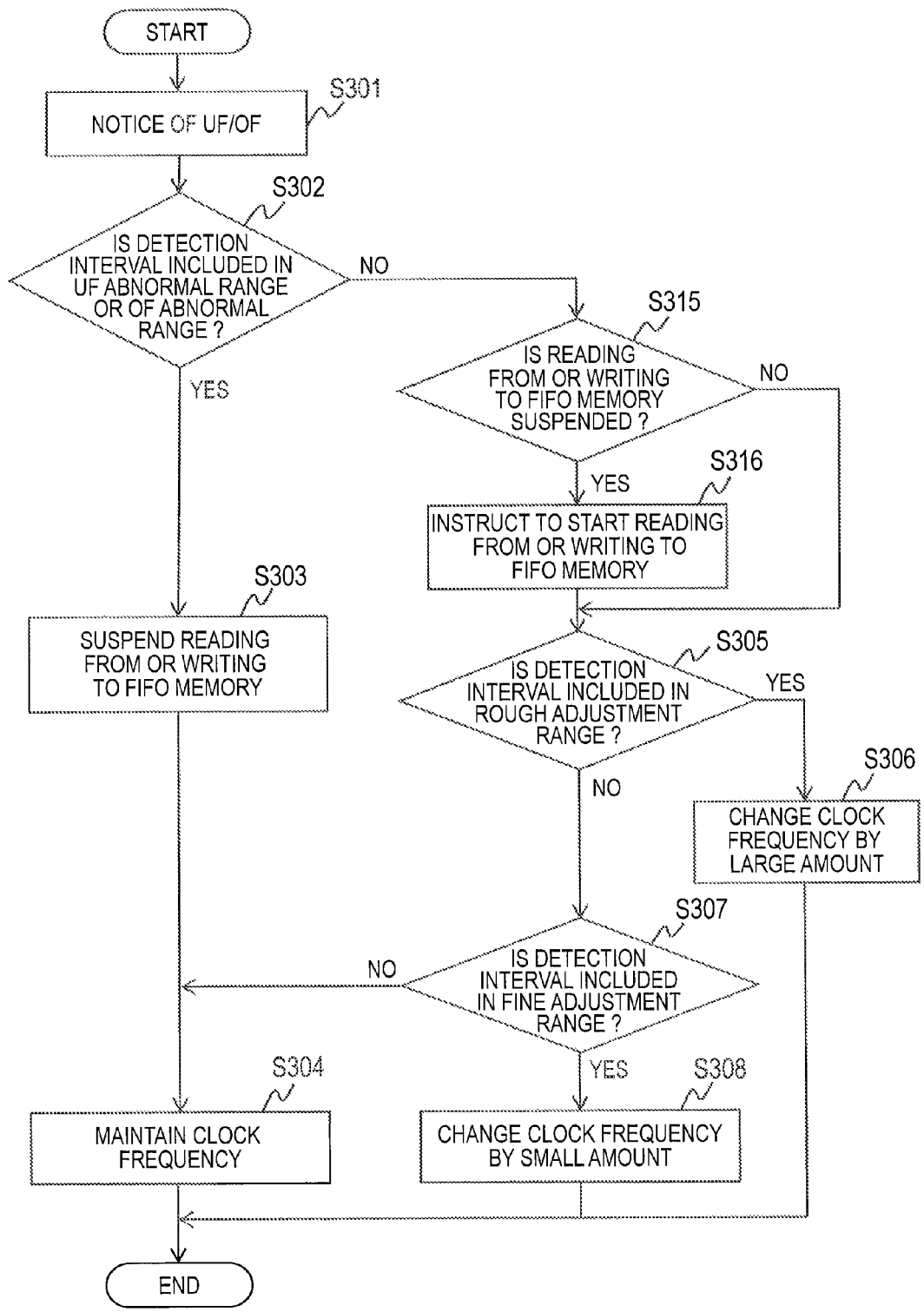
FIG. 10 is a flowchart illustrating processing of the rate recovery unit to change read frequency in the receiver in Embodiment 2.

FIG. 10 is a flowchart of read frequency control in the lane rate recovery unit 860-1. The other lane rate recovery units 860-2 to 860-a0 operate in accordance with the same flowchart. Now with reference to FIG. 10, FIFO control by the address manager 820-1 is described.

The address manager 820-1 acquires a notification of detection of underflow or overflow from the FIFO unit 810-1 (S301). The address manager 820-1 determines which range includes the interval between this detection of underflow or overflow and the previous detection among the ranges shown in FIG. 11. The interval between detections of underflow and the interval between detections of overflow are individually measured. The determination may use a value obtained from the values of a plurality of detection intervals, such as a moving average of detection intervals.

If the detection interval is included in the underflow abnormal range (<T1) or the overflow abnormal range (<T2) (YES at S302), the address manager 820-1 instructs the FIFO unit 810-1 to suspend reading or writing (S303). The address manager 820-1 maintains the clock frequency without change (S304).

If the detection interval is not included in the underflow abnormal range or the overflow abnormal range (NO at S302), the address manager 820-1 determines whether reading or writing by the FIFO unit 810-1 is suspended (S315). The FIFO unit 810-1 starts reading or writing (S316).

If the detection interval is included in the rough adjustment range on the underflow side (between T1 and T3) or the rough adjustment range on the overflow side (between T2 and T4) (NO at S302 and YES at S305), the address manager 820-1 lowers or raises the clock frequency by a large amount (S306). If the detection interval is included in the fine adjustment range on the underflow side (between T3 and T5) or the fine adjustment range on the overflow side (between T4 and T6) (NO at S305 and YES at S307), the address manager 820-1 lowers or raises the clock frequency by a small amount (S308). If the detection interval is included in the no adjustment range (>T5 or >T6) (NO at S307), the address manager 820-1 maintains the clock frequency without change (S304).

When the detection interval is included in the no adjustment range, the transmission data rate for valid data to the FIFO unit 810-1 is balanced with the transmission data rate from the FIFO unit 810-1 and the read frequency is at a value consistent with the transmission data rate of the interface IF1.

The foregoing determination of the range including the detection interval may be performed by the internal FIFO controller in the FIFO unit 810-1. The address manager 820-1 acquires the result of determination from the FIFO unit 810-1 to control the PLL controller 850.

Figure 12:
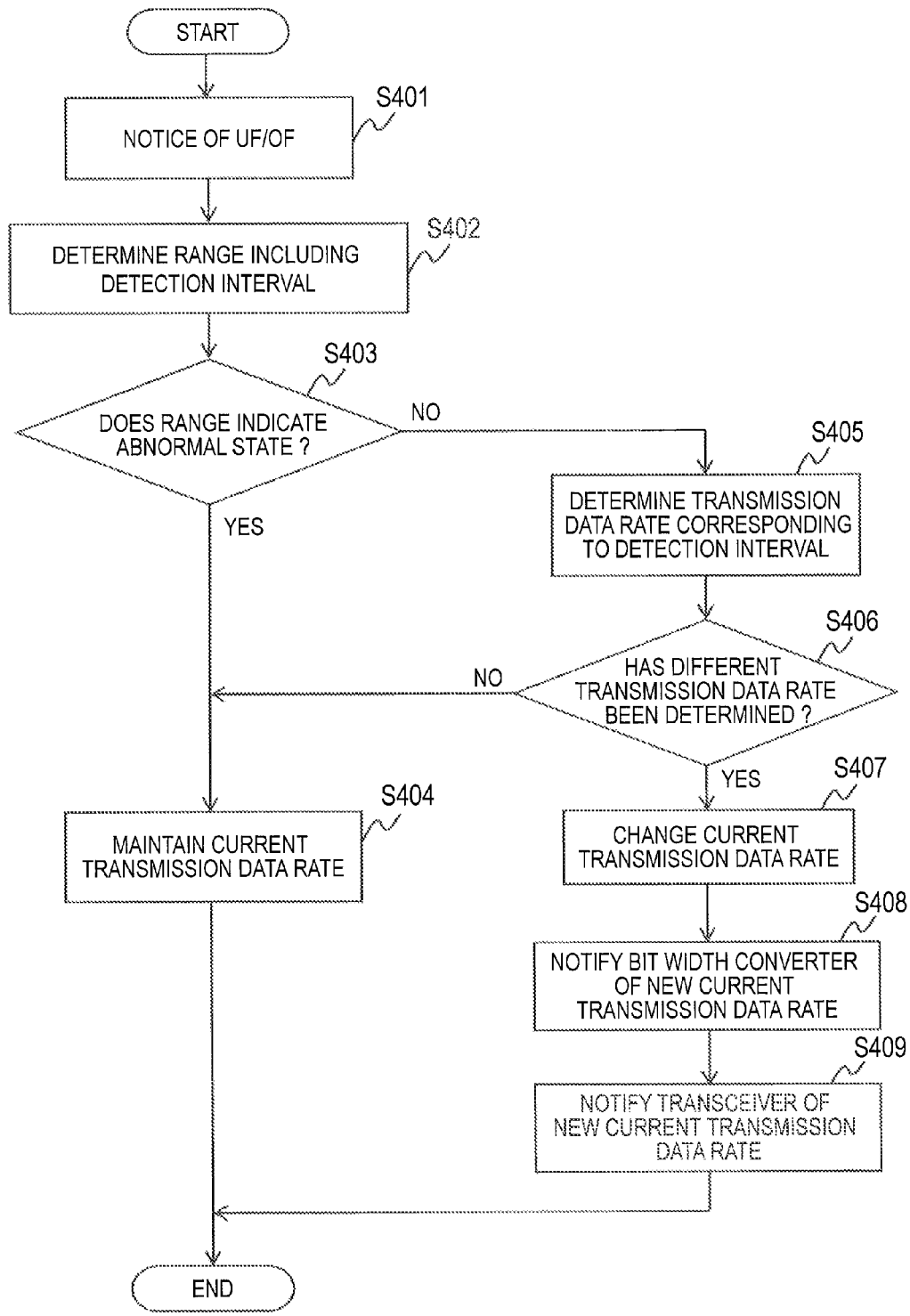
FIG. 12 is a flowchart illustrating processing of the rate recovery unit to estimate a transmission data rate in the receiver in Embodiment 2.

Next, with reference to FIG. 12, a method of determining the transmission data rate is described. For example, the lane rate recovery unit 860-1 performs the processing of this flowchart before starting the FIFO control described with reference to FIGS. 10 and 11. The lane rate recovery unit 860-1 determines the transmission data rate based on the interval between detections of underflow/overflow in the FIFO unit 810-1. The method of measuring the detection interval is the same as that in the control of the read frequency described with reference to FIGS. 10 and 11. The threshold for detection of UF/OF may be the same as or different from the one in the control of the read frequency.

The address manager 820-1 acquires a notification of detection of underflow or overflow from the FIFO unit 810-1 (S401). The address manager 820-1 determines the range including the measured underflow or overflow detection interval (S402). The address manager 820-1 holds beforehand thresholds defining a plurality of ranges of detection interval for underflow and overflow.

If the detection interval is shorter than the threshold and is included in the underflow abnormal range or the overflow abnormal range (YES at S403), the address manager 820-1 saves the record of detection of an abnormal state without changing the current transmission data rate (S404). The address manager 820-1 may notify the administrator of the abnormal state automatically or in response to a request of the administrator.

If the detection interval is out of the range indicating an abnormal state (NO at S403), the address manager 820-1 determines the transfer data rate corresponding to the range including the detection interval (S405). The address manager 820-1 has beforehand information associating the range including the detection interval with the transfer data rate for each of the underflow and the overflow. This is the same as the method of determining the transmission data rate using the write cycle in Embodiment 1.

A shorter underflow detection interval (the range including it) is associated with a lower transmission data rate and a shorter overflow detection interval (the range including it) is associated with a higher transmission data rate.

The address manager 820-1 determines whether the transmission data rate represented by the detection interval is different from the current transmission data rate (S406). The address manager 820-1 has a memory holding the transmission data rate determined by the previous measurement. The address manager 820-1 compares the transmission data rate measured this time with the value of the transmission data rate in the memory. The subsequent steps S407 to S409 are the same as Steps S207 to S209 in the flowchart of FIG. 8 in Embodiment 1.

The data transport system in the above-described Embodiment 2 can control the FIFO unit of the receiver and make determination on the transmission data rate with reference to the overflow/underflow in addition to the effects of Embodiment 1.

It should be noted that the rate recovery unit may control the read frequency of the FIFO unit in accordance with the method of Embodiment 1 and recover the transmission data rate in accordance with the method of Embodiment 2. The rate recovery unit may control the read frequency in accordance with the method of Embodiment 2 and recover the transmission data rate in accordance with the method of Embodiment 2.

What is claimed is:

1. A data transport system for transporting data via a transmission channel, the data transport system comprising:
   a transmitter including:
      a plurality of rate detectors for receiving data from a plurality of input interfaces; and
      a data unit composer for adding management data to user data forwarded by the plurality of rate detectors to compose data units and sending the data units to the transmission channel; and
   a receiver including:
      a data unit decomposer for receiving the data units transmitted via the transmission channel and extracting the user data including invalid data and valid data by removing the management data from the received data units; and
      a plurality of rate estimators for receiving data forwarded by the data unit decomposer and outputting the data to different output interfaces,
   wherein each rate detector of the plurality of rate detectors inputs valid data from an associated input interface to a first FIFO unit,
   wherein each rate detector of the plurality of rate detectors controls read frequency of the first FIFO unit based on an amount of remaining data in the first FIFO unit,
   wherein each rate detector of the plurality of rate detectors adds invalid data to valid data retrieved from the first FIFO unit to generate user data,
   wherein each rate detector of the plurality of rate detectors sends the user data to the data unit composer,
   wherein each rate estimator of the plurality of rate estimators selects valid data from the user data forwarded by the data unit decomposer,
   wherein each rate estimator of the plurality of rate estimators inputs the selected valid data to a second FIFO unit, wherein each rate estimator of the plurality of rate estimators controls read frequency of the second FIFO unit based on an amount of remaining data in the second FIFO unit, and wherein each rate estimator of the plurality of rate estimators estimates a transmission data rate of the associated input interface in the transmitter based on at least one of a write cycle in writing the valid data to the second FIFO unit and the amount of remaining data in the second FIFO unit.

2. The data transport system according to claim 1, wherein each rate estimator of the plurality of rate estimators measures a write cycle in writing the valid data to the second FIFO unit and estimates the transmission data rate from the measured value of the write cycle using information associating values of the write cycle and transmission data rates.

3. The data transport system according to claim 1, wherein each rate estimator of the plurality of rate estimators detects an underflow state or an overflow state of the second FIFO unit based on the amount of remaining data in the second FIFO unit and estimates the transmission data rate from transmission data rates associated beforehand with intervals of detection of the underflow state or the overflow state.

4. The data transport system according to claim 1, wherein each rate estimator of the plurality of rate estimators further includes a bit width converter for receiving data forwarded by the second FIFO unit and a parallel/serial converter for receiving output from the bit width converter, and wherein each rate estimator of the plurality of rate estimators controls a bit width after converted by the bit width converter based on the estimated transmission data rate.

5. The data transport system according to claim 1, wherein each rate estimator of the plurality of rate estimators determines an adjustment amount for the read frequency of the second FIFO unit in accordance with an amount deviated from a reference value of the amount of remaining data in the second FIFO unit.

6. The data transport system according to claim 1, wherein each rate estimator of the plurality of rate estimators detects an underflow state or an overflow state of the second FIFO unit based on the amount of remaining data in the second FIFO unit and controls the read frequency of the second FIFO unit based on detection intervals between detections of the underflow state and the overflow state.

7. The data transport system according to claim 1, wherein each rate estimator of the plurality of rate estimators determines a number of transmission lanes to transmit the user data to the data unit composer based on the read frequency of the first FIFO unit.

8. A receiver for receiving data sent from a transmitter via a transmission channel, the receiver comprising:

a data unit decomposer for receiving data units transmitted via the transmission channel and extracting user data including invalid data and valid data by removing management data from the received data units; and a plurality of rate estimators for receiving data forwarded by the data unit decomposer and outputting the data to different output interfaces, wherein each rate estimator of the plurality of rate estimators selects valid data from the user data forwarded by the data unit decomposer, wherein each rate estimator of the plurality of rate estimators inputs the selected valid data to a FIFO unit, wherein each rate estimator of the plurality of rate estimators controls read frequency of the FIFO unit based on an amount of remaining data in the FIFO unit, and wherein each rate estimator of the plurality of rate estimators estimates a transmission data rate of an associated input interface in the transmitter based on at least one of a write cycle in writing the valid data to the FIFO unit and the amount of remaining data in the FIFO unit.

9. A transmitter for sending data to a receiver via a transmission channel, the transmitter comprising:

a plurality of rate detectors for receiving data from a plurality of input interfaces; and a data unit composer for adding management data to user data forwarded by the plurality of rate detectors to compose data units and sending the data units for the transmission channel, wherein each rate detector of the plurality of rate detectors inputs valid data forwarded by an associated input interface to a FIFO unit, wherein each rate detector of the plurality of rate detectors controls read frequency of the FIFO unit based on an amount of remaining data in the FIFO unit, wherein each rate detector of the plurality of rate detectors adds invalid data to valid data retrieved from the FIFO unit to generate user data, and wherein each rate detector of the plurality of rate detectors sends the user data to the data unit composer.

* * * * *